UNITED STATES PATENT OFFICE.

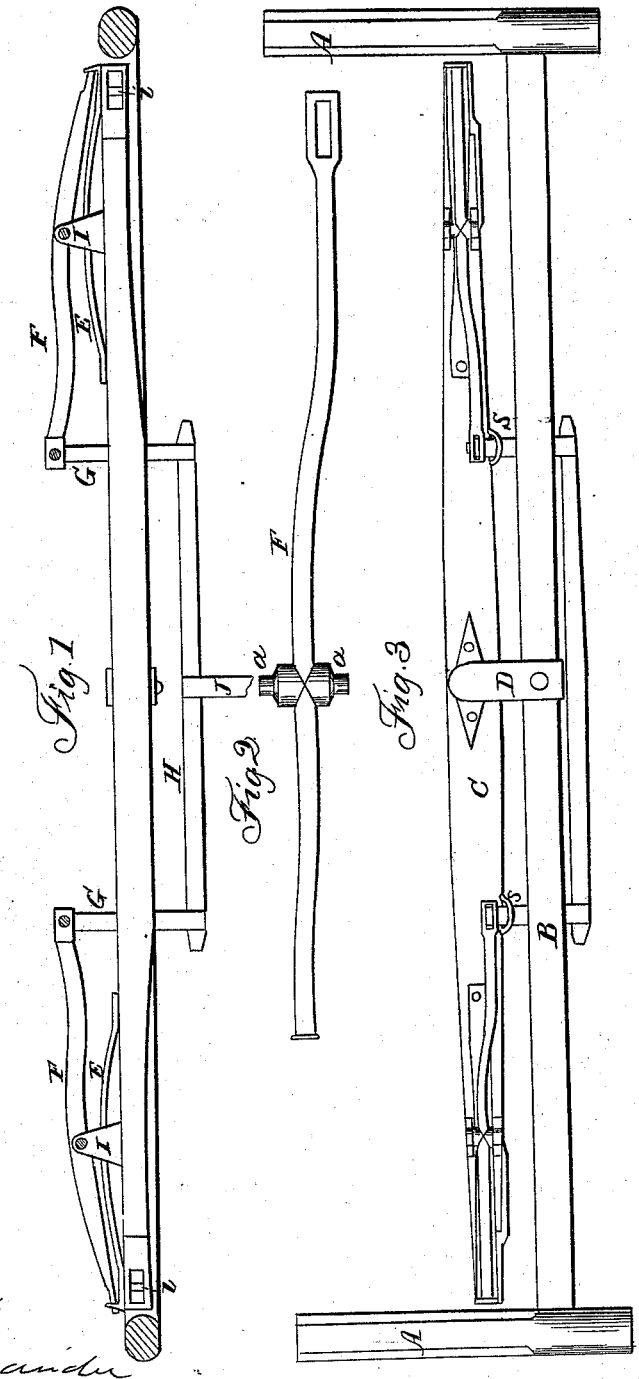

JOHN LAUGHLIN, OF GETTYSBURG, PENNSYLVANIA.

IMPROVEMENT IN MODE OF ATTACHING AND DETACHING WHIFFLETREES.

Specification forming part of Letters Patent No. 36,786, dated October 28, 1862.

*To all whom it may concern:*

Be it known that I, JOHN LAUGHLIN, of Gettysburg, in the county of Adams and State of Pennsylvania, have invented certain new and useful Improvements in Whiffletrees for Vehicles; and I do hereby declare that the following is a full, clear, and exact description of the same, reference being had to the accompanying drawings and to the letters of reference marked thereon.

In the annexed drawings, making part of this specification, A A represent the shafts of the vehicle connected together as usual, by the shaft-bar B.

C represents the whiffletree, which is connected to the shaft-bar by means of a metallic loop or strap, being pivoted so as to have proper play when in use. Upon each end of the whiffletree a metallic ferrule is secured, which is provided with a proper opening for receiving the end of the tug or trace.

E E represent two spring-bolts, (being springs with bolts attached,) which are secured at one end to the under side of the whiffletree. The outer ends of the springs are loose, while the bolts secured to them near their outer ends pass into openings made to receive them in the ferrules. *i i* show the bolts on these springs, which are made of steel.

F F represent two levers, which are secured to and have their fulcrums in the boxes I I. The boxes I are firmly attached to the under side of the whiffletree in any desired position to obtain the proper leverage by means of screws or other suitable manner. The levers F have journals cast on them, and the sides of the boxes I are cast with openings in them to receive these journals. The sides of the boxes are cast inclining or apart in such a way that the journals of the levers may be received. The sides are then pressed together against the sides of the levers, and thus secure said levers. The levers are made in bent form (shown in the drawings) for several reasons—to free them from danger of being damaged by the heels of the horse, to prevent friction when they are operated upon by the straps for that purpose, and also to avoid cutting a mortise through the whiffletree, which always greatly weakens it, especially when made of wood, as they generally are. One end of the levers F pass into an ear on the ends of the spring-bolts, as shown, thus connecting them together, while the other or inner ends of said levers are operated upon by means of straps G G which are attached to them.

H represents a bar or rod, which connects the straps G G, they being attached to it at each of its ends.

J represents a strap attached to the center of the bar H, which strap passes up over the dash-board of the vehicle and serves to operate the levers.

The arrangement of the bent levers with the spring-bolts, the straps G G, and the bar H makes a very simple, safe, and effective attaching and detaching apparatus. It matters not in what position the horse may be or in what direction you draw the cord J, the straps G G and the bar H will always operate the levers with unerring certainty. It will be seen that when the strap J passes over the dash-board the driver may detach the horse from the vehicle and at the same time hold up the shafts, so that no damage may accrue to them by falling upon the ground while the carriage is in rapid motion.

S S are loops upon the sides of the whiffletree, which hold the straps G G in proper position.

Having thus fully described my invention, what I claim as new, and desire to secure by Letters Patent, is—

The arrangement of the spring-bolts E E, the bent levers F F, the boxes I I, the straps G G J, and the bar H, constructed and operating in the manner and for the purpose herein specified.

JOHN LAUGHLIN.

Witnesses:
C. M. ALEXANDER,
G. M. ALEXANDER.